No. 700,231. Patented May 20, 1902.
C. H. PELTON.
GRAIN DRILL.
(Application filed Apr. 12, 1902.)
(No Model.)
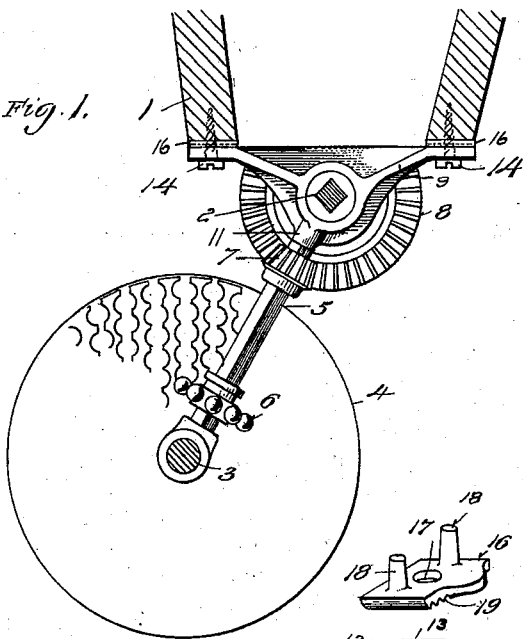
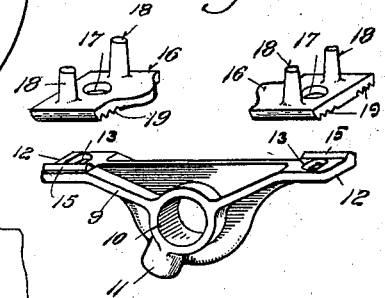
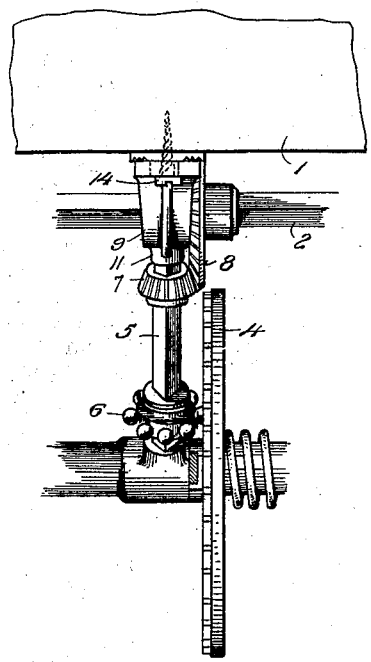
WITNESSES:
Will O'Laughlin
F. W. Schaefer
INVENTOR.
Charles H. Pelton
BY
ATTORNEY.
THE NORRIS PETERS CO., PHOTO-LITHO., WASHINGTON, D. C.

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

GRAIN-DRILL.

SPECIFICATION forming part of Letters Patent No. 700,231, dated May 20, 1902.

Application filed April 12, 1902. Serial No. 102,535. (No model.)

*To all whom it may concern:*

Be it known that I, CHARLES H. PELTON, a citizen of the United States, residing at Springfield, in the county of Clark and State of Ohio, have invented certain new and useful Improvements in Grain-Drills, of which the following is a specification, reference being had therein to the accompanying drawings.

This invention relates to grain-drills, and more particularly to the mechanism whereby motion is imparted to the distributers or feeding devices thereof, and has for its object to provide a construction whereby the gearing connecting the distributer-shaft and the shaft by means of which it is driven may be readily adjusted and maintained in proper relative position.

To these ends my invention consists in certain novel features, which I will now proceed to describe, and will then particularly point out in the claims.

In the accompanying drawings, Figure 1 is a sectional view of a portion of a grain-drill embodying my improvements. Fig. 2 is an elevation of the same, and Fig. 3 is a detail perspective view of the parts constituting the bearings of the shafts.

In the said drawings, 1 indicates the hopper of the grain-drill, and 2 the distributer-shaft, by means of which the distributing devices are operated, while the axle from which power to drive the distributer-shaft is derived is indicated at 3. It is usual to employ what is known as a "change-speed" gear to drive the distributer-shaft, the same comprising a change-speed disk 4, rotating with the axle, and a shaft 5, having a sliding pinion 6, driven from the change-speed gear and connected with the distributer-shaft by bevel-gearing—as, for instance, a bevel-pinion 7 on the shaft 5 and a bevel-gear 8 on the shaft 2. The shaft 2 is mounted in bearings secured to the under side of the hopper, and as this hopper is usually constructed of wood it is frequently found that after assembling the parts the bevel-gearing 7 and 8 does not properly mesh, owing to alterations in the shape of the hopper or to other causes. This necessitates the changing of the position of the bearing in which the shafts 2 and 5 are supported, so as to bring the bevel-gears into proper relation, and this changing in position of the bearing is usually accompanied by unsatisfactory results. This arises from the fact that the bearing is usually secured by bolts or screws to the woodwork of the hopper, and when its position is changed the new apertures for the bolts or screws conflict with or overlap the apertures first formed and necessitate plugging up these latter apertures, at the same time affording only an insecure connection. It is to overcome this difficulty that my present invention is more particularly devised; and it consists in the means whereby the bearing is secured to the hopper.

The bearing-block is indicated at 9 and is provided with a bearing-aperture 10 for the distributer-shaft and a second bearing-aperture or socket 11 for the change-speed shaft 5. The bearing head or block 9 is provided at its upper portion with lugs 12, by means of which it is secured to the under side of the hopper, said lugs being provided with slots 13, through which pass screws 14 for securing the bearing in place. Each lug 12 is provided on its upper surface with a rib 15, and I have shown only one rib on each lug, the ribs being located on opposite sides of the bearing. Between the bearing and hopper there is located at each end a locking-plate 16, having an aperture 17 for the passage of the corresponding screw 14 and provided on its upper side with pins or projections 18, which fit snugly in holes formed in the hopper to receive them and firmly hold the locking-plates in position. Each locking-plate is provided on its under side with a plurality of grooves 19, adapted to receive the corresponding rib 15 at that end of the bearing-block, and for purposes of economy in manufacture I have shown each locking-plate as provided with a plurality of such grooves at each side, so that said plates may be used on either side of the hopper.

By reason of the construction which I have devised in case it is found when the parts are assembled that the bearing-block is not in proper position to bring the gearing into mesh said bearing-block may be adjusted toward and from the bevel-pinion by simply loosening the screws and moving the bearing-block in one direction or the other, shifting the ribs 15 into the proper one of the grooves 19, the slots 13 permitting this adjustment of the bearing-block. After adjustment the screws 14 may be tightened, whereupon the bearing-block will be held firmly in place by said screws and the locking-plates, thus insuring a firm support for the bearing.

I do not wish to be understood as limiting myself to the precise details of construction hereinbefore described, and shown in the accompanying drawings, as it is obvious that these details may be varied without departing from the principle of my invention.

Having thus fully described my invention, what I claim as new, and desire to secure by Letters Patent, is—

1. In a grain-drill, the combination, with a hopper provided with grooved locking-plates on its under side, and a distributer-shaft and driving-shaft therefor provided with bevel-gearing, of a bearing-block having bearings for the said shafts, said bearing-block being slotted and adapted to engage the grooves of the locking-plates, and screws passing through the slots and into the hopper, substantially as described.

2. In a grain-drill, the combination, with a hopper having grooved locking-plates secured to its under side, of a distributer-shaft and a driving-shaft therefor provided with a bevel-gearing, a bearing-block provided with bearings for said shafts and having slotted lugs provided with ribs to engage the grooves of the locking-plates, and fastening-screws passing through said slots into the hopper, substantially as described.

3. In a grain-drill, the combination, with a hopper, of locking-plates having grooves on their under sides and provided with pins to enter the hopper and an intermediate aperture, a distributer-shaft and driving-shaft provided with bevel-gearing, a bearing-block having bearings for said shafts and having slotted lugs provided with ribs to engage the grooves of the locking-plates, and fastening-screws passing through the slots and through the apertures in the locking-plates into the hopper, substantially as described.

In testimony whereof I affix my signature in presence of two witnesses.

CHARLES H. PELTON.

Witnesses:
AL. H. KUNKLE,
WILL O'LAUGHLIN.